(12) United States Patent
Wang et al.

(10) Patent No.: US 10,740,008 B2
(45) Date of Patent: Aug. 11, 2020

(54) MEMORY AND DATA READING METHOD INCLUDING PERFORMING N READ OPERATIONS ON AN ADDRESS AND DETERMINING WHETHER THE DATA IS CONSISTENT

(71) Applicant: HUAWEI TECHNOLOGIES CO., LTD., Shenzhen, Guangdong (CN)

(72) Inventors: Mingguang Wang, Xi'an (CN); Yu Liu, Shanghai (CN); Jie Chen, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/814,066

(22) Filed: Nov. 15, 2017

(65) Prior Publication Data
US 2018/0136864 A1 May 17, 2018

(30) Foreign Application Priority Data
Nov. 15, 2016 (CN) .......................... 2016 1 1013718

(51) Int. Cl.
*G06F 3/06* (2006.01)
*G06F 21/79* (2013.01)
*G06F 11/14* (2006.01)

(52) U.S. Cl.
CPC .......... *G06F 3/0623* (2013.01); *G06F 3/0604* (2013.01); *G06F 3/067* (2013.01);
(Continued)

(58) Field of Classification Search
CPC .... G06F 3/0623; G06F 3/0604; G06F 3/0653; G06F 3/067; G06F 11/1497; G06F 21/79; H04L 2209/08
See application file for complete search history.

(56) References Cited

U.S. PATENT DOCUMENTS 8,775,697 B2 * 7/2014 Romain ................ G06F 21/755
710/52
8,909,967 B1 12/2014 van Dijk
(Continued)

FOREIGN PATENT DOCUMENTS

CN 101588643 11/2009
EP 3007093 4/2016

OTHER PUBLICATIONS

Extended European Search Report, dated Mar. 19, 2018, in European Application No. 17201771.7 (9 pp.).

*Primary Examiner* — Glenn Gossage
(74) *Attorney, Agent, or Firm* — Fish & Richardson P.C.

(57) ABSTRACT

A data reading method includes receiving, by a controller of a memory, a read operation request carrying a first address; performing, by the controller, N read operations on the first address, and obtaining N pieces of data read by the N read operations; and determining, by the controller, whether the N pieces of data are consistent. The method further includes sending, by the controller, response information used to respond to the read operation request if the controller determines that the N pieces of data are consistent, where the response information includes any one of the N pieces of data. The controller may perform T random read operations between any two consecutive read operations of the N read operations to avoid data leakage during reading. If the N pieces of data obtained by performing the N read operations are inconsistent, the memory may send abnormal alarm information to respond to the read operation request to avoid data tampering. An apparatus including a controller and different modules for performing the operations of the method are also disclosed.

12 Claims, 13 Drawing Sheets

(52) U.S. Cl.
CPC ........ *G06F 3/0653* (2013.01); *G06F 11/1497* (2013.01); *G06F 21/79* (2013.01); *H04L 2209/08* (2013.01)

(56) References Cited

U.S. PATENT DOCUMENTS

| | | |
|---|---|---|
| 2003/0204696 A1 | 10/2003 | Yi |
| 2011/0072222 A1 | 3/2011 | Wagner et al. |
| 2013/0205080 A1* | 8/2013 | Felton ............... G06F 21/79 711/105 |
| 2017/0060460 A1* | 3/2017 | Sugahara ............ G06F 13/161 |

* cited by examiner

MEMORY AND DATA READING METHOD INCLUDING PERFORMING N READ OPERATIONS ON AN ADDRESS AND DETERMINING WHETHER THE DATA IS CONSISTENT

CROSS-REFERENCE TO RELATED APPLICATION

This application claims priority to Chinese Patent Application No. 201611013718.X, filed on Nov. 15, 2016, which is hereby incorporated by reference in its entirety.

TECHNICAL FIELD

The present invention relates to the data processing field, and in particular, to a data reading method and a memory.

BACKGROUND

A data reading operation is a most common operation in the data processing field. Generally, a process of the data reading operation is: A data reading device sends a read operation instruction to a data storage unit, and after receiving the read operation instruction, the data storage unit obtains, according to an address carried in the read operation instruction, data corresponding to the address, and returns the data corresponding to the address to the data reading device. According to the foregoing process, the data reading device obtains the data corresponding to the address. However, during the process in which the data reading device performs the foregoing read operation, an attacker obtains the address carried in the read operation instruction and the data corresponding to the address by monitoring a data bus between the data and a controller of the data reading device, and can arbitrarily tamper with the data. Consequently, data is leaked, and data security is seriously threatened.

SUMMARY

Embodiments of the present invention provide a data reading method and a memory, so as to help resolve the problem that data is tampered with and leaked during a data reading process.

According to a first aspect, an embodiment of the present invention provides a data reading method, including:

receiving, by a controller of a memory, a read operation request carrying a first address, where the read operation request is used to instruct the controller to perform a read operation on the first address;

performing, by the controller of the memory, N read operations on the first address, and obtaining N pieces of data read by the N read operations; and determining, by the controller of the memory, whether the N pieces of data are consistent; and if the controller determines that the N pieces of data are consistent, sending, by the controller, response information used to respond to the read operation request, where the response information includes any one of the N pieces of data. The problem that the data is tampered with is resolved by performing the N read operations on the same address and comparing data read by the N read operations.

In some feasible embodiments, the read operation request is sent by a processor of a first terminal device in which the memory is located, or a second terminal device connected to the first terminal device in which the memory is located.

In some feasible embodiments, between any two consecutive read operations of the N read operations performed by the controller of the memory on the first address, the method further includes: performing, by the controller of the memory, T random read operations, where the T random read operations are read operations respectively performed on T random addresses. The problem that the data is leaked during the reading process is resolved in the foregoing scrambling manner.

In some feasible embodiments, T and the T random addresses are generated by the controller of the memory according to a random number generated by the controller, and any two of the T random addresses are different.

In some feasible embodiments, the controller of the memory discards data obtained by the T random read operations. An operating rate of the controller is improved by discarding the data obtained by the random read operations.

In some feasible embodiments, if the N pieces of data are inconsistent, the memory sends abnormal alarm information used to respond to the read operation request. The problem that the data is tampered with during the reading process is resolved by reporting the abnormal alarm information.

According to a second aspect, an embodiment of the present invention provides a memory, including:

a receiving module, configured to receive a read operation request carrying a first address, wherein the read operation request is used to instruct the memory to perform a read operation on the first address;

a read operation module, configured to perform N read operations on the first address, and obtain N pieces of data read by the N read operations;

a determining module, configured to determine whether the N pieces of data are consistent; and a sending module, configured to: when the determining module determines that the N pieces of data are consistent, send response information used to respond to the read operation request, wherein the response information includes any one of the N pieces of data. The problem that the data is tampered with is resolved by performing the N read operations on the same address and comparing data read by the N read operations.

In some feasible embodiments, the read operation request carrying the first address received by the receiving module is sent by a processor of a first terminal device in which the memory is located, or a second terminal device connected to the first terminal device in which the memory is located.

In some feasible embodiments, between any two consecutive read operations of the N read operations performed by the read operation module on the first address, the read operation module is further configured to perform T random read operations, and the T random read operations are read operations respectively performed on T random addresses. The problem that the data is leaked during the reading process is resolved in the foregoing scrambling manner.

In some feasible embodiments, the memory further includes a random number generation module, T and the T random addresses are generated by the read operation module according to a random number generated by the memory, and any two of the T random addresses are different.

In some feasible embodiments, the read operation module discards data obtained by the T random read operations. An operating rate of the controller is improved by discarding the data obtained by the random read operations.

In some feasible embodiments, the sending module is further configured to send abnormal alarm information used to respond to the read operation request if the determining module determines that the N pieces of data are inconsistent. The problem that the data is tampered with during the reading process is resolved by reporting the abnormal alarm information.

According to a third aspect, an embodiment of the present invention provides a memory, including:

a storage medium that stores executable program code;

a controller coupled to the storage medium; and calling, by the controller, the executable program code stored in the storage medium, and performing some or all of the steps of the method of the first aspect according to the present invention.

These aspects or other aspects of the present invention will be more simple and easy to understand in the following embodiments.

BRIEF DESCRIPTION OF DRAWINGS

To describe the technical solutions in the embodiments of the present invention more clearly, the following briefly describes the accompanying drawings required for describing the embodiments or the prior art. The accompanying drawings in the following description show merely some embodiments of the present invention, and persons of ordinary skill in the art may still derive other drawings from these accompanying drawings without creative efforts.

DESCRIPTION OF EMBODIMENTS

To make persons skilled in the art understand the technical solutions in the present invention better, the following clearly describes the technical solutions with reference to the accompanying drawings in the embodiments of the present invention. The described embodiments are merely a part rather than all of the embodiments of the present invention. All other embodiments obtained by persons of ordinary skill in the art based on the embodiments of the present invention without creative efforts shall fall within the protection scope of the present invention.

Details are separately described in the following.

In the specification, claims, and accompanying drawings of the present disclosure, the terms "first", "second", "third", "fourth", and so on are intended to distinguish between different objects but do not indicate a particular order. Moreover, the terms "including", "comprising", or any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

"An embodiment" mentioned in the specification indicates that a particular characteristic, structure or property that is related to the embodiment may be included in at least one embodiment of the present invention. The phrase at various locations in the specification does not necessarily refer to the same embodiment, or an independent or alternate embodiment exclusive of another embodiment. Persons skilled in the art understand, in explicit and implicit manners, that an embodiment described in this application may be combined with another embodiment.

In the following, some terms in this application are described, so as to help persons skilled in the art have a better understanding.

"Multiple" refers to two or more than two. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

The following describes the embodiments of this application with reference to accompanying drawings.

For a better understanding of a data reading method and an apparatus disclosed in the embodiments of the present invention, the following first describes an example to which this embodiment of the present invention is applicable.

Figure 1:
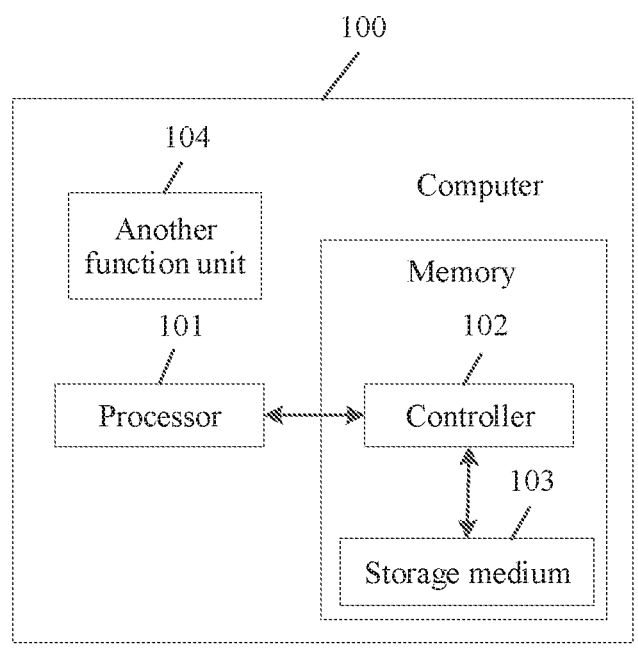
FIG. 1 is a schematic diagram of an example of a data reading method according to an embodiment of the present invention.

Referring to FIG. 1, FIG. 1 is a schematic diagram of an example of a data reading method according to an embodiment of the present invention.

In the example shown in FIG. 1, a computer 100 may include a processor 101, a memory constituted by a controller 102 and a storage medium 103, and another function unit 104. The foregoing processor 101 and the controller 102 of the foregoing memory are connected by using a bus, and the controller 102 of the foregoing memory and the storage medium 103 are connected by using the bus. It should be noted herein that the foregoing processor 101 and the foregoing memory may be produced by the same manufacturer, or may be produced by different manufacturers. For ease of representation, in FIG. 1, the foregoing bus connection manner is represented by using only a double-arrow solid line. The foregoing computer 100 may further be replaced by a tablet computer, a smartphone, a smartwatch, a smart band, or another intelligent electronic device. The data reading method provided in this embodiment of the present invention is applied to the foregoing memory, constituted by the controller 102 and the storage medium 103.

Figure 2:
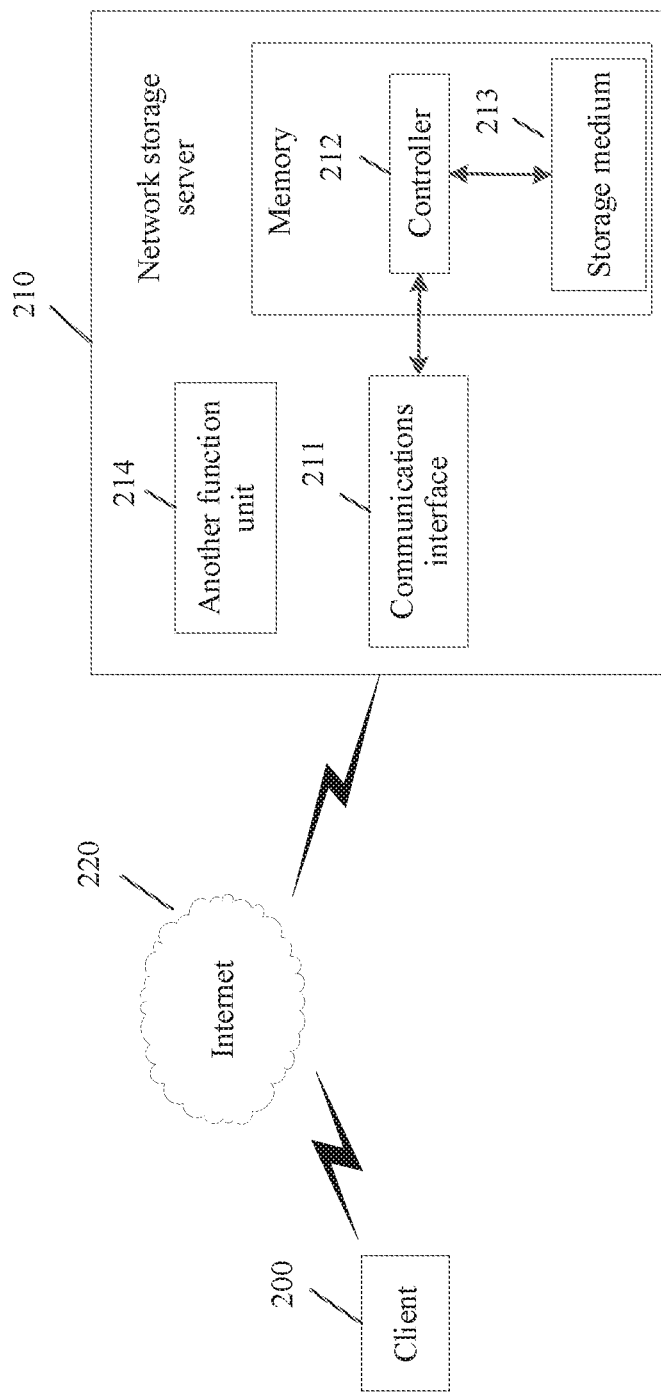
FIG. 2 is a schematic diagram of an example of another data reading method according to an embodiment of the present invention.

Referring to FIG. 2, FIG. 2 is a schematic diagram of an example of another data reading method according to an embodiment of the present invention. In the example shown in FIG. 2, a network storage server 210, a client 200, and the Internet 220 that connects the network storage server 210 with the client 200 may be included. The foregoing network storage server 210 includes a communications interface 211, a memory constituted by a controller and a storage medium 213, and another function unit 214. The foregoing communications interface 211 and the controller 212 of the memory are connected by using a bus, and the controller 212 of the foregoing memory and the storage medium 213 are connected by using a bus. For ease of representation, in FIG. 2, the foregoing bus connection manner is represented by using only a double-arrow solid line. A communication manner between the foregoing network storage server 210 and the Internet 220, and the client 200 and the Internet 220 may be a wired manner or a wireless manner. The foregoing wireless manner includes but is not limited to: Bluetooth®, Wi-Fi, ZigBee®, General Packet Radio Services (GPRS), Third-generation (3G), Fourth-generation (4G), Worldwide Interoperability for Microwave Access (WiMAX), and the like. The foregoing client 200 may be a computer, a smartphone, a smartwatch, a smart band, or another intelligent electronic device. The data reading method provided in this embodiment of the present invention is applied to a memory constituted by the controller 212 and the storage medium 213 in a first terminal 210.

Figure 3:
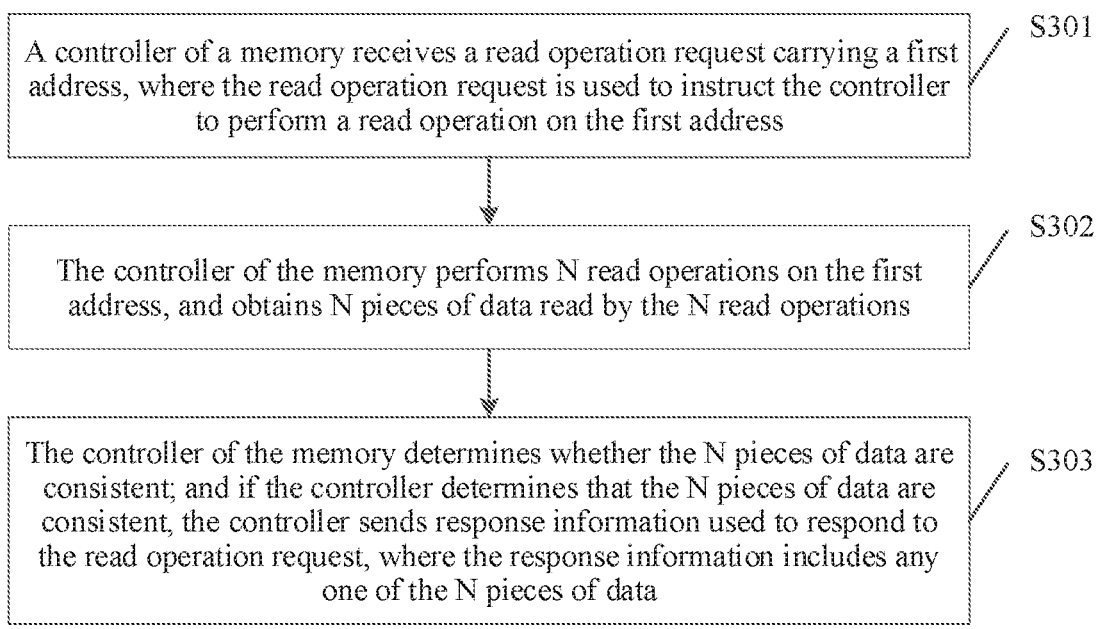
FIG. 3 is a schematic flowchart of a data reading method according to an embodiment of the present invention.

Referring to FIG. 3, FIG. 3 is a schematic flowchart of a data reading method according to an embodiment of the present invention. As shown in FIG. 3, the data method provided in this embodiment of the present invention includes:

S301. A controller of a memory receives a read operation request carrying a first address, where the read operation request is used to instruct the controller to perform a read operation on the first address.

The read operation request is sent by a processor of a first terminal device in which the memory is located, or a second terminal device connected to the first terminal device in which the memory is located.

Optionally, the foregoing first terminal device may be a smartphone, a smartwatch, a smart band, a computer, or another intelligent electronic device.

Optionally, the foregoing second terminal device may be a smartphone, a smartwatch, a smart band, a computer, or another intelligent electronic device, and may further be a network storage server, a cloud storage server, or another server.

Optionally, a bit number of, or the number of bits in, the foregoing first address may be equal to 4, 6, 8, 11, 14, 16, 21, 24, or another value. Preferably, the bit number or the number of bits of the foregoing first address is 14.

S302. The controller of the memory performs N read operations on the first address, and obtains N pieces of data read by the N read operations.

Between any two consecutive read operations of the N read operations performed by the controller of the memory on the first address, the method further includes:

performing, by the controller, T random read operations, where the T random read operations are read operations respectively performed on T random addresses, and T is a random read quantity.

The T random read operations and the T random addresses are generated by the controller of the memory according to a random number generated by the controller, and any two of the T random addresses are different.

Optionally, a bit number or number of bits of the foregoing random number may be equal to 2, 5, 8, 11, 16, 20, 25, 32, or another value. The bit number or number of bits of the foregoing random number is an integer. Preferably, the bit number or number of bits of the foregoing random number is 32, that is, the foregoing random number is 32 bits.

Optionally, the foregoing random read quantity T is generated by the foregoing memory according to any number of bits $N_1$ in the foregoing random number. $N_1$ may be equal to 1, 2, 3, 4, 7, 8, 11, or another value. Preferably, $N_1$ is 2.

Optionally, the foregoing random addresses are generated by the foregoing memory according to any number of bits $N_2$ in the foregoing random number. $N_2$ may be equal to 4, 5, 8, 11, 14, 16, 21, 24, or another value. Preferably, $N_2$ is 14.

The controller of the memory discards data obtained by the T random read operations.

Optionally, after the controller of the foregoing memory performs one random read operation on the random address, and before a next random read operation, the foregoing controller regenerates a random address according to the foregoing random number.

S303. The controller of the memory determines whether the N pieces of data are consistent; and if the controller determines that the N pieces of data are consistent, the controller sends response information used to respond to the read operation request, where the response information includes any one of the N pieces of data.

Optionally, a specific implementation for the controller of the foregoing memory to determine whether the N pieces of data are consistent is:

The foregoing controller selects one piece of data from the foregoing N pieces of data, and uses the piece of data as target data; and the foregoing controller compares the foregoing target data with remaining N−1 pieces of data one by one.

If the foregoing target data is consistent with the remaining N−1 pieces of data, the foregoing controller determines that the foregoing N pieces of data are consistent, and sends the response information used to respond to the foregoing read operation request, where the response information includes any one of the foregoing N pieces of data; or if the foregoing target data is inconsistent with the foregoing remaining N−1 pieces of data, the foregoing controller determines that the foregoing N pieces of data are inconsistent, and the foregoing memory sends abnormal alarm information used to respond to the read operation request.

It should be noted herein that the foregoing controller is the controller of the foregoing memory.

It can be learned that, in the solution of this embodiment of the present invention, the controller of the memory receives the read operation request carrying the first address, where the read operation request is used to instruct the controller to perform the read operation on the first address; the controller performs the N read operations on the first address, and obtains the N pieces of data read by the N read operations; the controller determines whether the N pieces of data are consistent; and if the controller determines that the N pieces of data are consistent, the controller sends the response information used to respond to the read operation request, where the response information includes any one of the N pieces of data. Between any two consecutive read operations of the N read operations performed on the first address, the controller performs T random read operations, where the T random read operations are the read operations respectively performed on T random addresses. Multiple read operations are performed on one address, and when obtained multiple pieces of data are consistent, it is determined that data corresponding to the address is not tampered with. This helps resolve the problem that data is tampered with during a reading process. Between any two of the multiple read operations performed on the address, multiple read operations are performed on the random address, and use of this scrambling manner helps resolve the problem that data is tampered with.

Figure 4A:
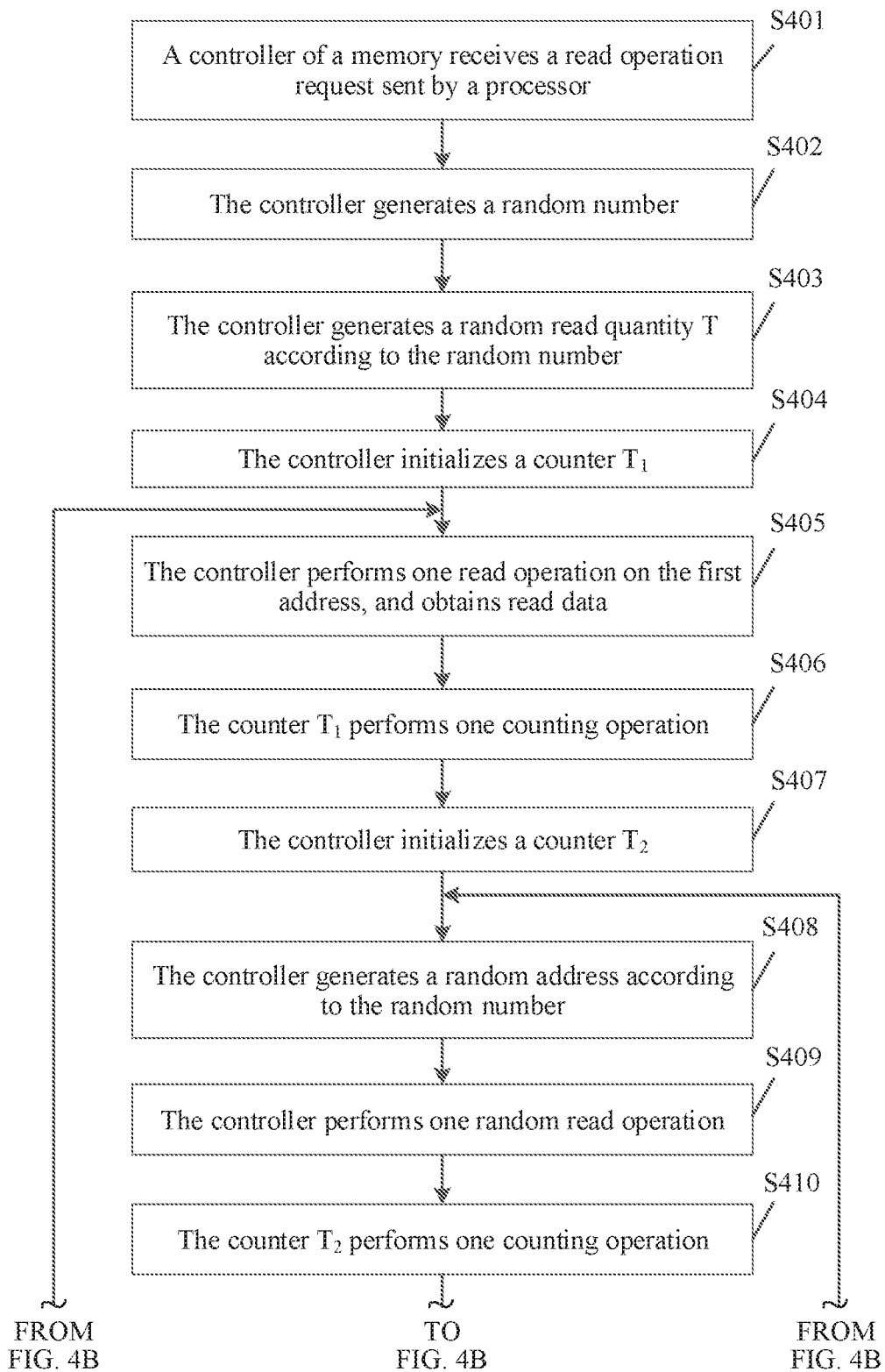
FIG. 4A and FIG. 4B are a more detailed schematic flowchart of a data reading method according to an embodiment of the present invention.
Figure 4B:
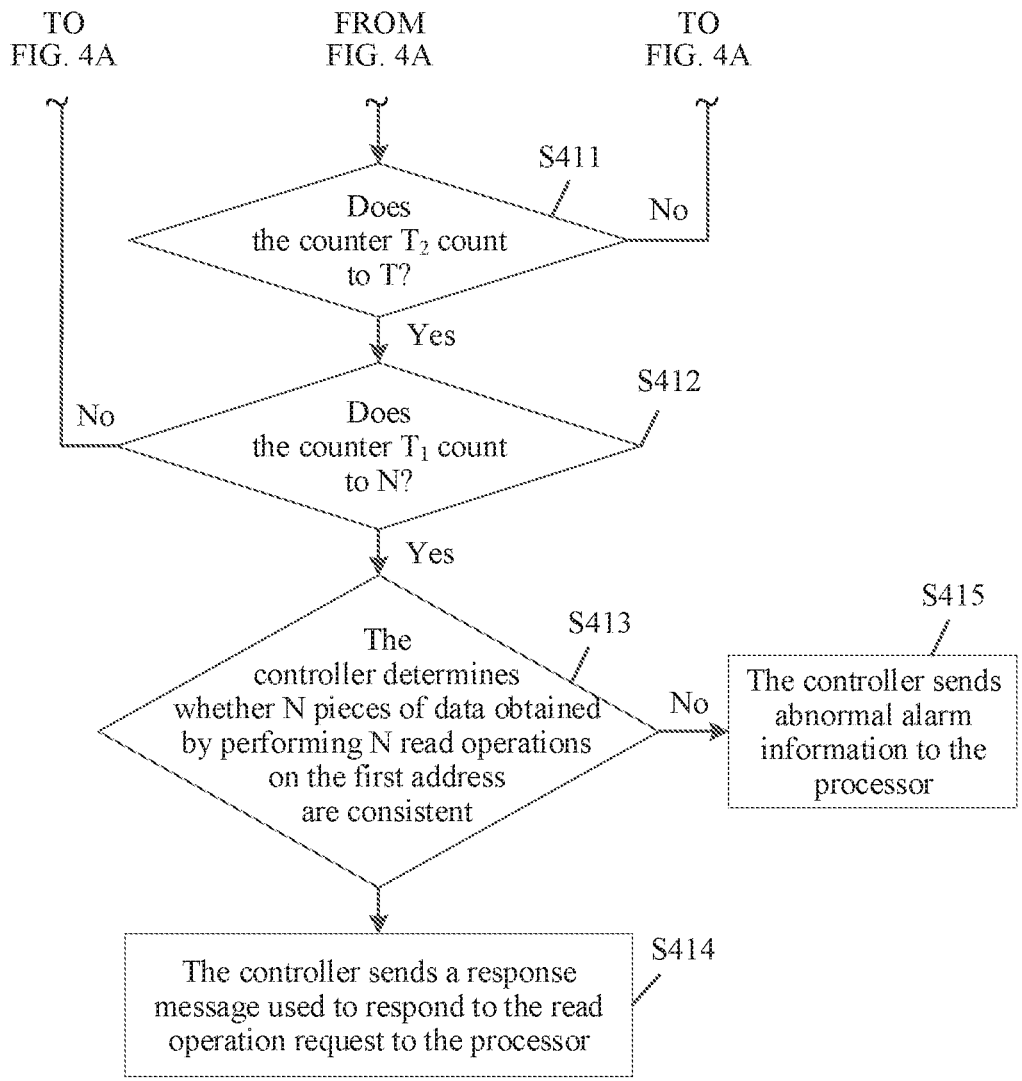

Referring to FIG. 4A and FIG. 4B, FIG. 4A and FIG. 4B are a more detailed schematic flowchart of a data reading method according to an embodiment of the present invention. As shown in FIG. 4A and FIG. 4B, the method includes:

S401. A controller of a memory receives a read operation request sent by a processor.

Optionally, the foregoing read operation request may be sent by a processor of a first terminal device in which the foregoing memory is located, or a second terminal device connected to the first terminal device in which the memory is located.

The foregoing read operation request carries a first address, and the foregoing read operation request is used to instruct the foregoing memory to perform a read operation on the foregoing first address.

S402. The controller generates a random number.

Optionally, a bit number or number of bits of the foregoing random number may be equal to 2, 5, 8, 11, 16, 20, 25, 32, or another value. The bit number or number of bits of the foregoing random number is an integer. Preferably, the bit number or number of bits of the foregoing random number is 32, that is, the foregoing random number is 32 bits.

S403. The controller generates a random read quantity T according to the random number.

The foregoing controller generates the foregoing random read quantity T according to any number of bits N1 in n M-bit random number, where N1 is an integer that is less than or equal to the M and greater than 0.

Optionally, $N_1$ may be equal to 1, 2, 3, 4, 7, 8, 11, or another value. Preferably, $N_1$ is 2.

S404. The controller initializes a counter $T_1$.

The foregoing controller sets an initial value of the counter $T_1$ to 0.

S405. The controller performs one read operation on the first address, and obtains read data.

A specific process for the foregoing controller to perform the read operation is:

The foregoing controller obtains, according to the foregoing first address, data corresponding to the foregoing first address in a storage medium of the memory.

S406. The counter $T_1$ performs one counting operation.

That the foregoing counter $T_1$ performs one counting operation is specifically: $T_1=T_1+\Delta_1$. Optionally, $\Delta_1$ may be equal to 1, 2, 3, or another value. Preferably, $\Delta_1$ is 1.

S407. The controller initializes a counter $T_2$.

The foregoing controller sets an initial value of the counter $T_2$ to 0.

S408. The controller generates a random address according to the random number.

The foregoing controller generates the foregoing random address according to any number of bits $N_2$ in the foregoing M-bit random number, where $N_2$ is an integer that is less than or equal to M and greater than 0.

Optionally, $N_2$ may be equal to 4, 5, 8, 11, 14, 16, 21, 24, or another value. Preferably, $N_2$ is 14.

S409. The controller performs one random read operation on the random address.

A specific process for the foregoing controller to perform the random read operation is:

The foregoing controller obtains, according to the foregoing random address, data corresponding to the foregoing random address in the storage medium of the memory.

Optionally, after obtaining the data corresponding to the foregoing random address, the foregoing controller discards the data.

S410. The counter $T_2$ performs one counting operation.

That the foregoing counter $T_2$ performs one counting operation is specifically: $T_2=T_2+\Delta_2$. Optionally, $\Delta_2$ may be equal to 1, 2, 3, or another value. Preferably, $\Delta_2$ is 1.

S411. The controller determines whether the counter $T_2$ counts to the random read quantity T.

If the foregoing counter T2 counts to the foregoing random read quantity T, the foregoing controller performs step S412; or if the foregoing counter T2 does not count to the foregoing random read quantity T, the foregoing controller performs step S408 (FIG. 4A).

S412. The controller determines whether the counter $T_1$ counts to N.

If the foregoing counter $T_1$ counts to N, the controller performs step S413; or if the foregoing counter $T_1$ does not count to N, the controller performs step S405 (FIG. 4A).

Optionally, N may be equal to 2, 4, 5, 8, or another value. Preferably, N is 2.

It should be noted herein that N is a read operation quantity for the foregoing first address performed by the foregoing controller.

S413. The controller determines whether N pieces of data obtained by performing N read operations on the first address are consistent.

If the foregoing controller determines that the N pieces of data obtained by performing the N read operations on the foregoing first address are consistent, the foregoing controller performs step S414; or if the foregoing controller determines that the N pieces of data obtained by performing the N read operations on the foregoing first address are inconsistent, the foregoing controller performs step S415.

S414. The controller sends response information used to respond to the read operation request to the processor.

The foregoing response information carries the data corresponding to the foregoing first address.

S415. The memory sends abnormal alarm information to the processor.

It should be noted herein that the foregoing controller is the controller of the foregoing memory.

It should be noted that, for a specific implementation process of each step of the method shown in FIG. 4A and FIG. 4B, reference may be made to the specific implementation process described in the foregoing method, and details are not described herein again.

Figure 5A:
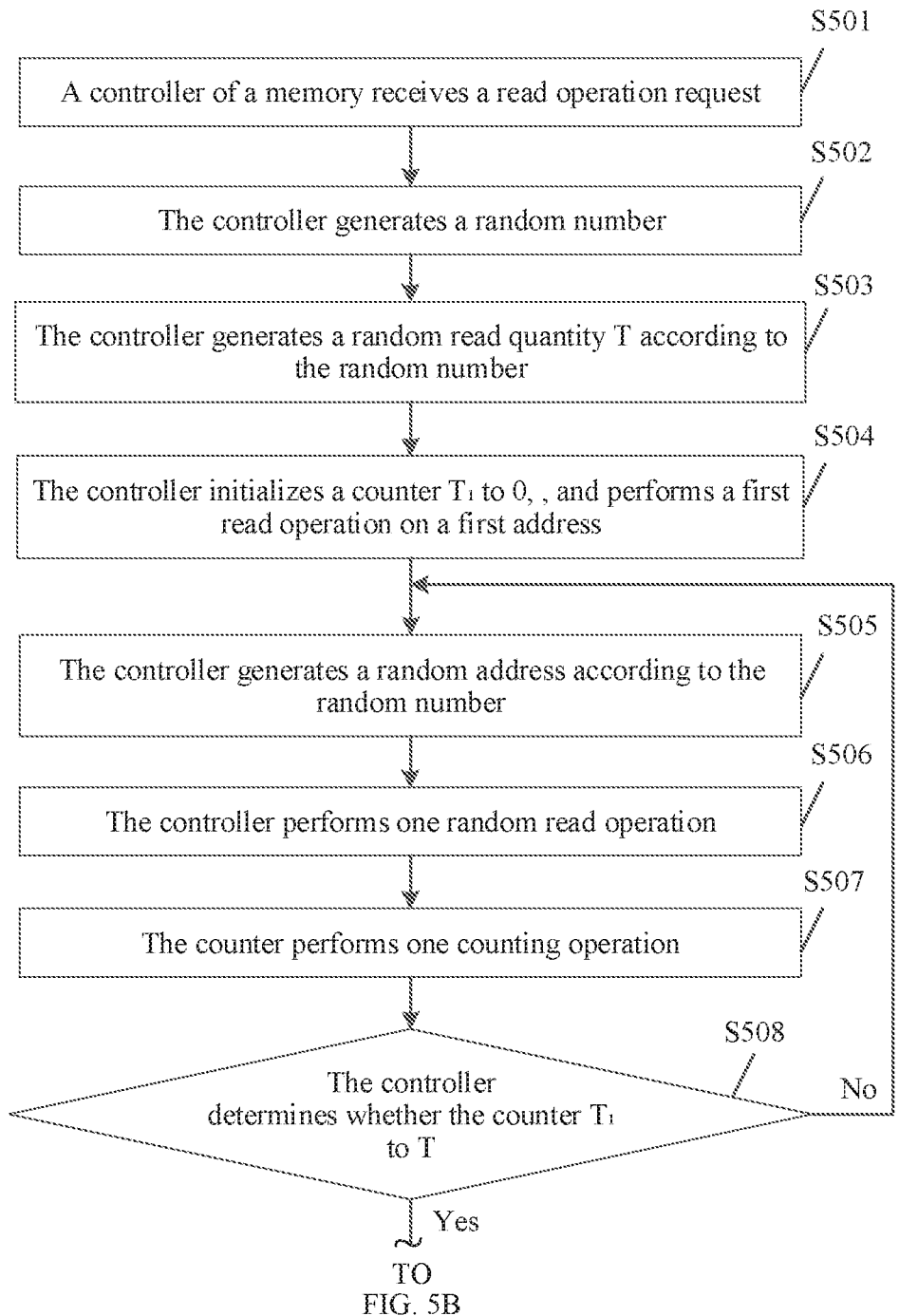
FIG. 5A and FIG. 5B are a schematic flowchart of an alternative data reading method according to an embodiment of the present invention.
Figure 5B:
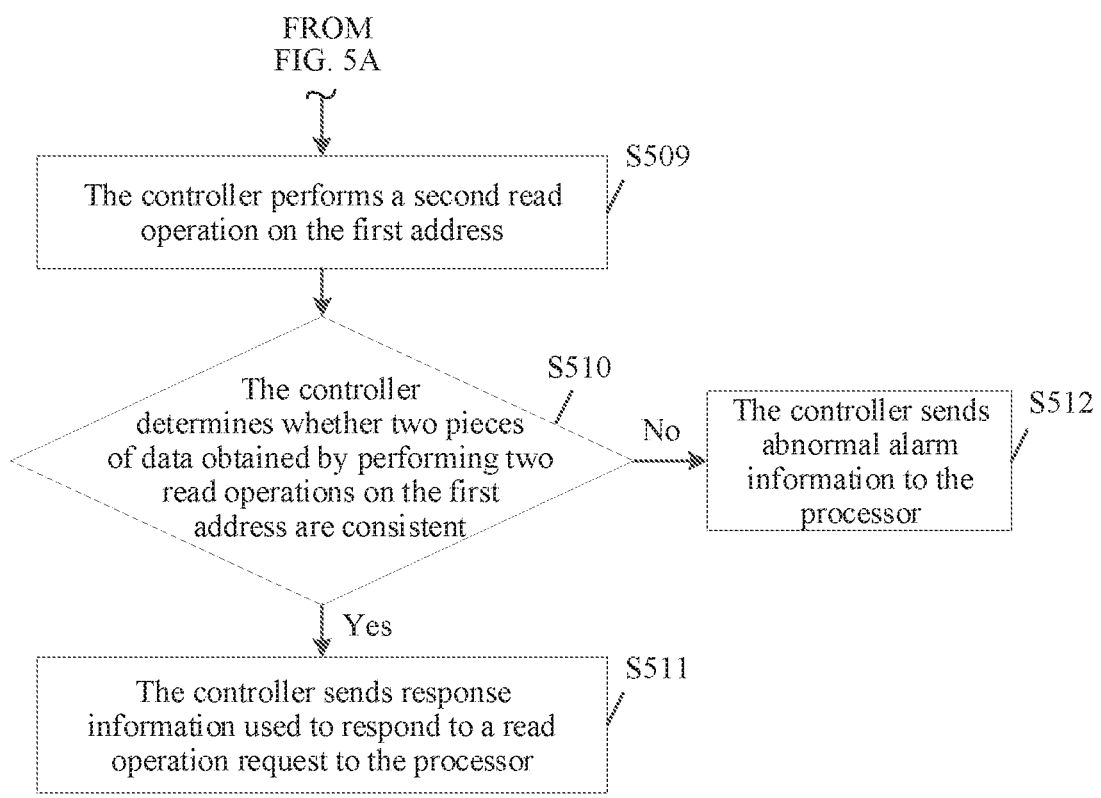

Referring to FIG. 5A and FIG. 5B, FIG. 5A and FIG. 5B are a schematic flowchart of a preferred data reading method according to an embodiment of the present invention. As shown in FIG. 5A and FIG. 5B, the method includes:

S501. A controller of a memory receives a read operation request sent by a processor.

The foregoing processor and the foregoing memory are in the same terminal device.

It should be noted herein that the foregoing processor and the foregoing memory may be produced by the same manufacturer, or may be produced by different manufacturers.

S502. The controller generates a random number.

S503. The controller generates a random read quantity T according to the random number.

S504. The controller initializes an initial value of a counter $T_1$ to 0, and performs a first read operation on a first address to obtain read data.

S505. The controller generates a random address according to the random number.

S506. The controller performs one random read operation on the random address.

S507. The counter $T_1$ of the controller performs one counting operation.

S508. The controller determines whether the counter $T_1$ counts to the random read quantity T.

If the foregoing controller determines that the foregoing counter T1 counts to the foregoing random read quantity T, the foregoing controller performs step S509 (FIG. 5B); or if the foregoing controller determines that the foregoing counter T1 does not count to the foregoing random read quantity T, the foregoing controller performs step S505.

S509. The controller performs a second read operation on the first address, and obtains read data.

S510. The controller determines whether two pieces of data obtained by performing two read operations on the first address are consistent.

If the foregoing controller determines that the two pieces of data obtained by performing the two read operations on the foregoing first address are consistent, the foregoing controller performs step S511; or if the foregoing controller determines that the two pieces of data obtained by performing the two read operations on the foregoing first address are inconsistent, the foregoing controller performs step S512.

A specific manner for the foregoing controller to determine whether data obtained by performing the two read operations on the foregoing first address is consistent is: The foregoing controller compares the data obtained by the two read operations bit by bit; and if data corresponding to any bit and data corresponding to a corresponding bit are inconsistent, the foregoing controller determines that the data obtained by the foregoing two read operations is inconsistent, or if data corresponding to any bit and data corresponding to a corresponding bit are consistent, the foregoing controller determines that the data obtained by the foregoing two read operations is consistent.

S511. The controller sends response information used to respond to the read operation request to the processor.

S512. The memory sends abnormal alarm information to the processor.

It should be noted herein that the foregoing controller is the controller of the foregoing memory.

It should be noted that, for a specific implementation process of each step of the method shown in FIG. 5A and FIG. 5B, reference may be made to the specific implementation process described in the foregoing method, and details are not described herein again.

Figure 6A:
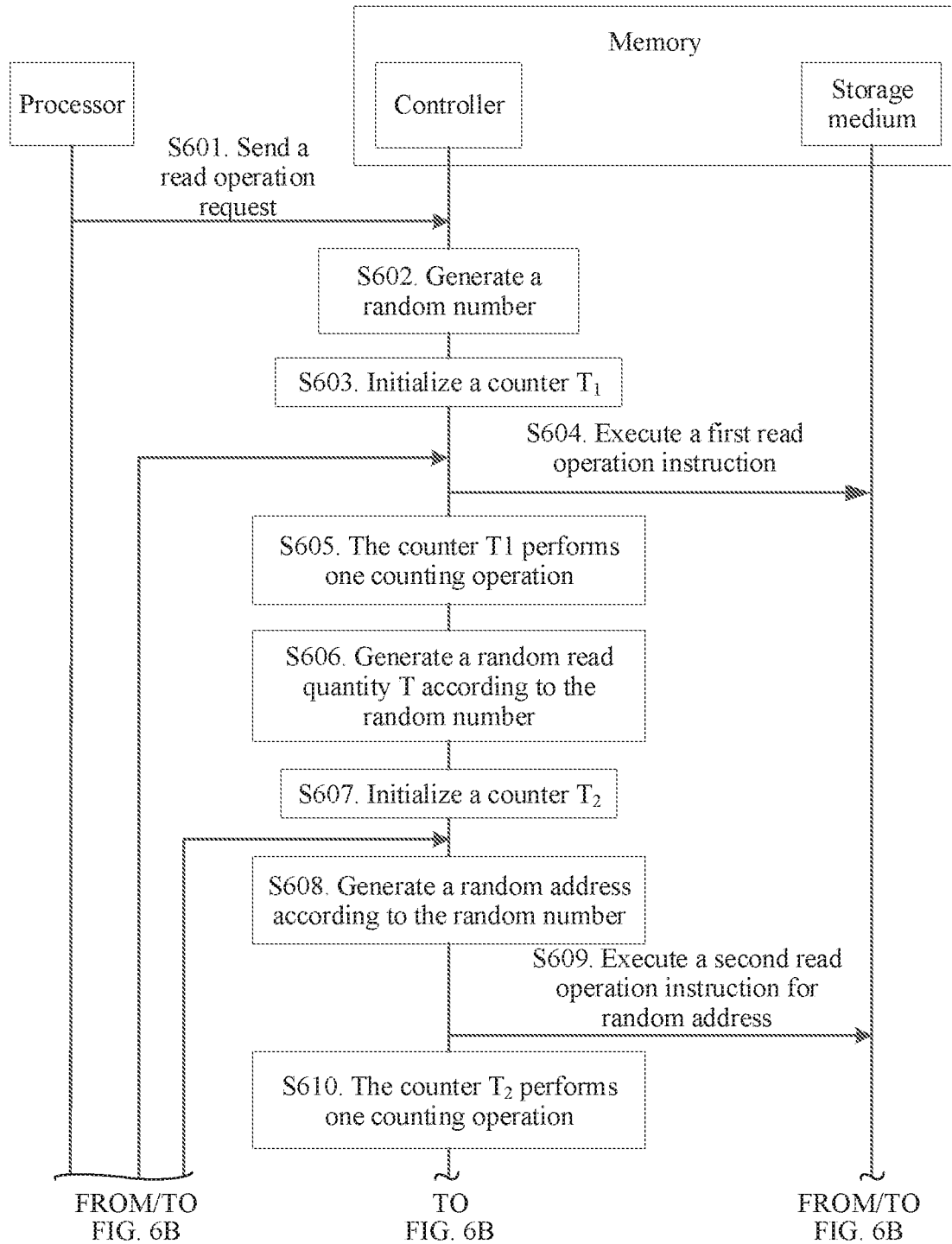
FIG. 6A and FIG. 6B are a schematic flowchart of an interactive data reading method according to an embodiment of the present invention.
Figure 6B:
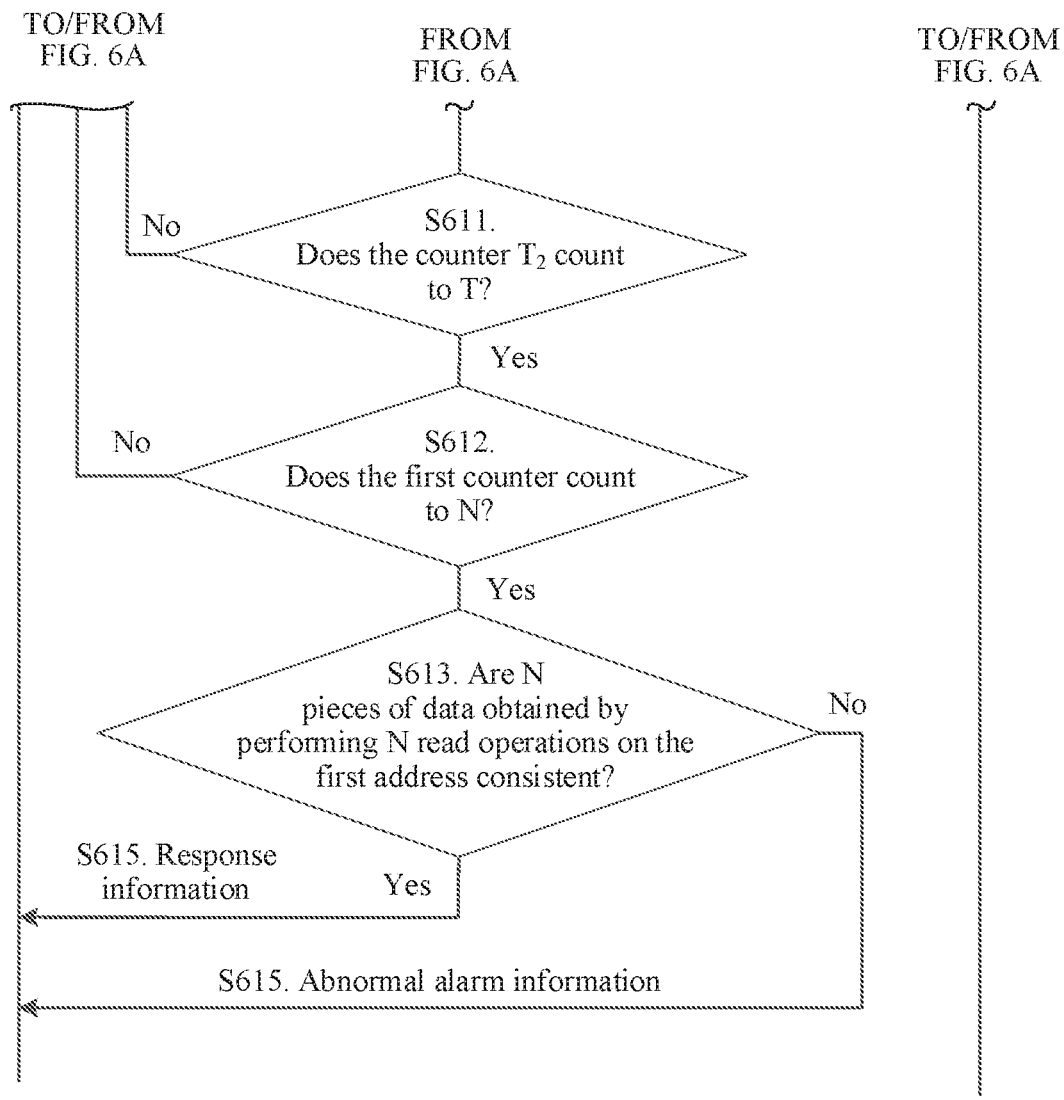

Referring to FIG. 6A and FIG. 6B, FIG. 6A and FIG. 6B are a schematic flowchart of an interactive data reading method according to an embodiment of the present invention. As shown in FIG. 6A and FIG. 6B, the method includes:

S601. A processor sends a read operation instruction or request carrying a first address to a controller of a memory, where the read operation instruction or request is used to instruct a processor of the controller to perform a read operation on the first address.

The foregoing processor and the foregoing memory are in the same terminal device.

It should be noted herein that the foregoing processor and the foregoing memory may be produced by the same manufacturer, or may be produced by different manufacturers.

S602. The controller of the memory generates a random number.

S603. The controller initializes a counter $T_1$.

That the foregoing controller initializes the counter $T_1$ is to set an initial value of the counter $T_1$ to 0.

S604. The controller executes a first read operation instruction.

The foregoing first read operation instruction carries the foregoing first address information.

A specific process for the foregoing controller to execute the foregoing first read operation instruction is: The foregoing controller obtains data corresponding to the foregoing first address in a storage medium of the foregoing memory according to the first address carried in the foregoing first read operation instruction.

S605. After the controller obtains the data corresponding to the first address, the counter T1 performs one counting operation.

S606. The controller generates a random read quantity T according to the random number.

S607. The controller initializes a counter $T_2$.

That the foregoing controller initializes the counter $T_2$ is to set an initial value of the counter $T_2$ to 0.

S608. The controller generates a random address according to the random number.

S609. The controller executes a second read operation instruction.

The foregoing second read operation instruction carries the foregoing random address.

A specific process for the foregoing controller to execute the foregoing second read operation instruction: The foregoing controller obtains data corresponding to the foregoing random address in the storage medium of the foregoing memory according to the random address carried in the foregoing second read operation instruction.

Optionally, after obtaining the data corresponding to the foregoing random address, the foregoing controller discards the data.

S610. After the controller obtains the data corresponding to the random address, the counter $T_2$ performs one counting operation.

S611. The controller determines whether the counter $T_2$ counts to the foregoing random read quantity T.

If the foregoing controller determines that the foregoing counter $T_2$ counts to the foregoing random read quantity T, the foregoing controller performs step S612; or if the foregoing controller determines that the foregoing counter $T_2$ does not count to the foregoing random read quantity T, the foregoing controller performs step S608 (FIG. 6A).

S612. The controller determines whether the counter $T_1$ counts to N.

If the foregoing controller determines that the counter $T_1$ counts to N, the foregoing controller performs step S613; or if the foregoing controller determines that the counter $T_1$ does not count to N, the foregoing controller performs step S604 (FIG. 6A).

It should be noted herein that N is a read operation quantity for the foregoing first address performed by the foregoing controller.

S613. The controller determines whether N pieces of data obtained by performing N read operations on the first address are consistent.

If the foregoing controller determines that the N pieces of data obtained by performing the N read operations on the foregoing first address are consistent, the foregoing controller performs step S614; or if the foregoing controller determines that the N pieces of data obtained by performing the N read operations on the foregoing first address are inconsistent, the foregoing controller performs step S615.

S614. The controller sends response information used to respond to the read operation request to the processor, where the response information includes any one of the N pieces of data.

S615. The controller sends abnormal alarm information to the processor.

It should be noted herein that the foregoing controller is the controller of the foregoing memory.

It should be noted that, for a specific implementation process of each step of the method shown in FIG. 6A and FIG. 6B, reference may be made to the specific implementation process described in the foregoing method, and details are not described herein again.

Figure 7A:
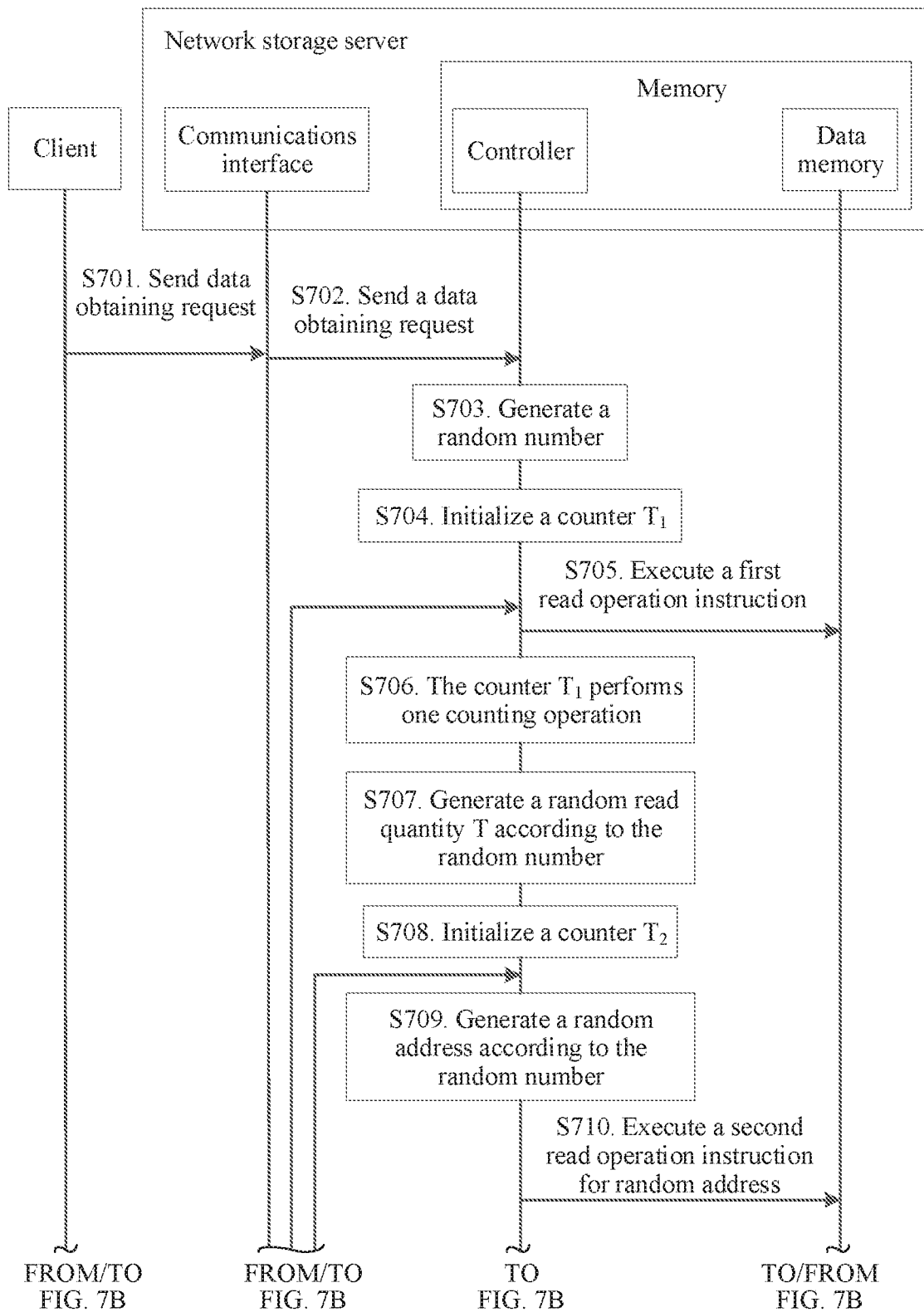
FIG. 7A and FIG. 7B are a schematic flowchart of another interactive data reading method according to an embodiment of the present invention.
Figure 7B:
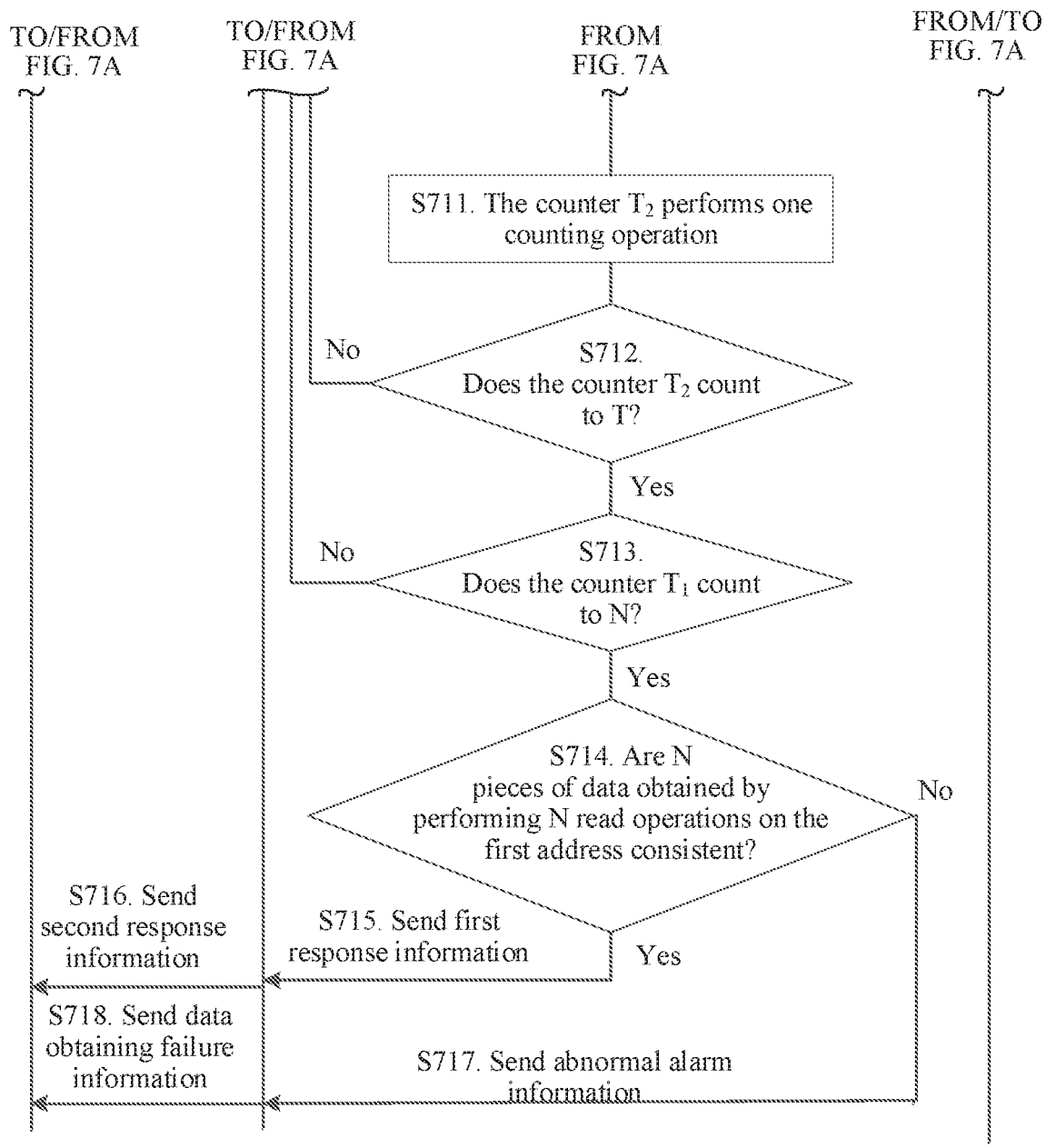

Referring to FIG. 7A and FIG. 7B, FIG. 7A and FIG. 7B are a schematic flowchart of another interactive data reading method according to an embodiment of the present invention. As shown in FIG. 7A and FIG. 7B, the method includes:

S701. A client sends a data obtaining request to a network storage server.

S702. After receiving the data obtaining request, a communications interface of the network storage server sends the data obtaining request to a memory of the network storage server.

A controller of the foregoing memory obtains, according to a data type carried in the foregoing data obtaining request, a first address corresponding to the data type carried in the foregoing data obtaining request.

S703. The controller of the memory generates a random number.

S704. The controller initializes a counter $T_1$.

That the foregoing controller initializes the counter $T_1$ is to set an initial value of the counter $T_1$ to 0.

S705. The controller executes a first read operation instruction.

The foregoing first read operation instruction carries the foregoing first address. A specific process for the foregoing controller to execute the foregoing first read operation instruction is: The foregoing controller obtains data corresponding to the foregoing first address in a storage medium of the foregoing memory according to the first address carried in the foregoing first read operation instruction.

S706. After the controller obtains the data corresponding to the foregoing first address, the counter $T_1$ performs one counting operation.

S707. The controller generates a random read quantity T according to the random number.

S708. The controller initializes a counter $T_2$.

That the foregoing controller initializes the counter $T_2$ is to set an initial value of the counter $T_2$ to 0.

S709. The controller generates a random address according to the random number.

S710. The controller executes a second read operation instruction.

The foregoing second read operation instruction carries the foregoing random address. A specific process for the foregoing controller to execute the second read operation instruction is: The foregoing controller obtains data corresponding to the foregoing random address in the storage medium of the foregoing memory according to the random address carried in the foregoing second read operation instruction.

Optionally, after obtaining the data corresponding to the foregoing random address, the foregoing controller discards the data.

S711. After the controller obtains the data corresponding to the random address, the counter $T_2$ performs one counting operation.

S712. The controller determines whether the counter $T_2$ counts to the foregoing random read quantity T.

If the foregoing controller determines that the second counter counts to the foregoing random read quantity T, the foregoing controller performs step S713; or if the foregoing controller determines that the foregoing counter $T_2$ does not count to the foregoing random read quantity T, the foregoing controller performs step S709 (FIG. 7A).

S713. The controller determines whether the counter $T_1$ counts to N.

If the foregoing controller determines that the foregoing counter $T_1$ counts to N, the foregoing controller performs step S714; or if the foregoing controller determines that the foregoing counter $T_1$ does not count to N, the foregoing controller performs step S705 (FIG. 7A).

It should be noted herein that N is a read operation quantity for the foregoing first address performed by the foregoing controller.

S714. The controller determines whether N pieces of data obtained by performing N read operations on the first address are consistent.

If the foregoing controller determines that the N pieces of data obtained by performing the N read operations on the foregoing first address are consistent, the foregoing controller performs step S715; or if the foregoing controller determines that the N pieces of data obtained by performing the N read operations on the foregoing first address are inconsistent, the foregoing controller performs step S717.

S715. The controller sends first response information used to respond to a read operation request to the communications interface, where the first response information includes any one of the N pieces of data.

S716. The communications interface sends second response information used to respond to the data obtaining request to the client, where the second response information includes information in the first response information.

S717. The controller sends abnormal alarm information to the communications interface.

S718. The processor sends data obtaining failure information to the client.

It should be noted herein that the foregoing controller is the controller of the foregoing memory.

It should be noted that, for a specific implementation process of each step of the method shown in FIG. 7A and FIG. 7B, reference may be made to the specific implementation process described in the foregoing method, and details are not described herein again.

Figures 8, 9:
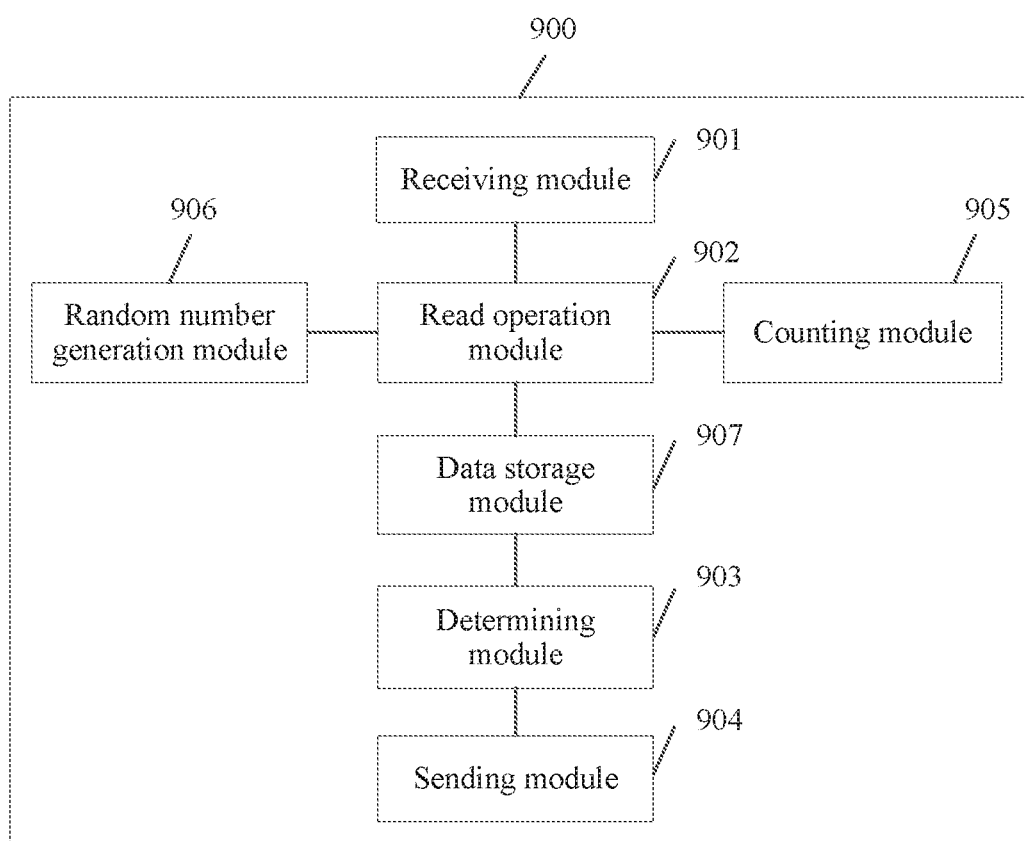
FIG. 8 is a schematic diagram of storing data by a storage medium according to an embodiment of the present invention.
FIG. 9 is a schematic structural diagram of a memory according to an embodiment of the present invention.

Referring to FIG. 8, FIG. 8 is a schematic diagram of storing data by a storage medium according to an embodiment of the present invention. Examples are used to describe a process of reading data by a memory in detail with reference to FIG. 8.

It is assumed that a processor of a terminal device in which the memory is located sends a read operation request to a controller of the memory, and the read operation request carries an address "0x3F", and data corresponding to the address "0x3F" in the storage medium is "10111011"; and it is assumed that the controller of the foregoing memory performs two read operations on the address "0x3F", and if data read by performing the two read operations on the address "0x3F" by the controller of the foregoing memory is "10111011", the controller of the foregoing memory sends response information used to respond to the foregoing read operation request to the foregoing processor, where the information carries the foregoing data "10111011". If for the address "0x3F", data read for a first time is "10111011", and data read for a second time is "10101011", data read two times is inconsistent, and the controller of the foregoing memory sends abnormal alarm information to the foregoing processor.

It is assumed that between the two read operations performed by the foregoing controller on the address "0x3F", the foregoing controller performs five random read operations, data obtained by the five random read operations is discarded. The foregoing five random read operations are respectively performed on five random addresses.

Referring to FIG. 9, FIG. 9 is a schematic structural diagram of a memory according to an embodiment of the present invention. As shown in FIG. 9, the memory 900 provided in this embodiment of the present invention includes: a receiving module 901, a read operation module 902, a determining module 903, and a sending module 904.

The receiving module 901 is configured to receive a read operation request carrying a first address, where the read operation request is used to instruct the memory to perform a read operation on the first address.

Optionally, the read operation request carrying the first address received by the receiving module 901 is sent by a processor of a first terminal device in which the memory is located, or a second terminal device connected to the first terminal device in which the memory is located.

The read operation module 902 is configured to perform N read operations on the first address, and obtain N pieces of data read by the N read operations.

Between any two consecutive read operations of the N read operations performed by the read operation module 902 on the first address, the read operation module 902 is further configured to perform T random read operations, and the T random read operations are read operations respectively performed on T random addresses.

The foregoing memory 900 further includes a counting module 905, configured to: after the foregoing read operation module 902 performs one read operation, perform one counting operation.

Optionally, the foregoing memory 900 further includes a data storage module 907, configured to: after the foregoing read operation module 902 performs one read operation, according to an address sent by the foregoing read operation module 902, obtain data corresponding to the address.

Figure 10:
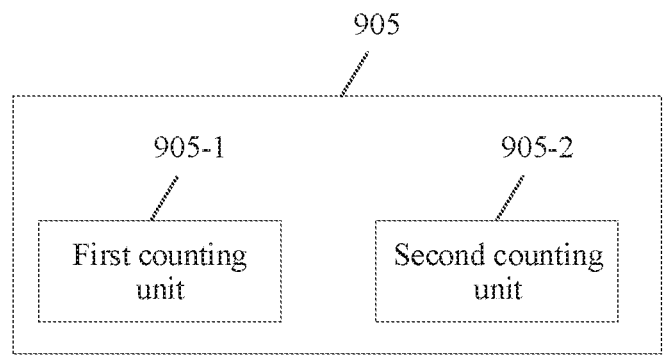
FIG. 10 is a partial schematic structural diagram of a memory according to an embodiment of the present invention.

Optionally, as shown in FIG. 10, the foregoing counting module may include:

a first counting unit 905-1, configured to: after the foregoing read operation module 902 performs one read operation on the foregoing first address, perform one counting operation; and a second counting unit 905-2, configured to: after the foregoing read operation module 902 performs one read operation on the foregoing random address, perform one counting operation.

Referring again to FIG. 9, the memory 900 further includes a random number generation module 906, T and the T random addresses are generated by the read operation module 902 according to a random number generated by the random number generation module 906, and any two of the T random addresses are different.

Optionally, the read operation module discards data obtained by the T random read operations.

The determining module 903 is configured to determine whether the N pieces of data are consistent.

The sending module 904 is configured to: when the determining module determines that the N pieces of data are consistent, send response information used to respond to the read operation request, where the response information includes any one of the N pieces of data.

Optionally, if the determining module 903 determines that the N pieces of data are inconsistent, the sending module 904 is further configured to send abnormal alarm information used to respond to the read operation request.

It should be noted that the foregoing modules (the receiving module 901, the read operation module 902, the determining module 903, the sending module 904, the counting module 905, and the random number generation module 906) are configured to perform related steps of the foregoing method.

In this embodiment, the memory 900 is presented in a form of a module. The "module" herein may refer to an application-specific integrated circuit (ASIC), and executes one or more processors and integrated logic circuits of a software or hardware program, and/or other devices that can provide the foregoing function. In addition, the receiving module 901, the read operation module 902, the determining module 903, the sending module 904, the counting module 905, and the random number generation module 906 may be implemented by a controller 1101 of the memory shown in FIG. 11.

Figure 11:
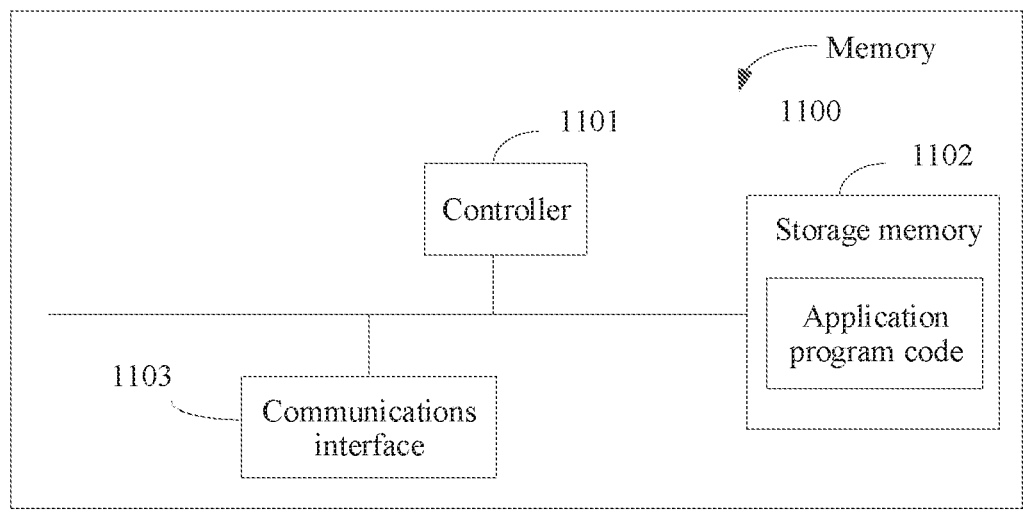
FIG. 11 is a schematic structural diagram of another memory according to an embodiment of the present invention.

As shown in FIG. 11, a memory 1100 may be implemented by using the structure in FIG. 11. The memory 1100 includes at least one controller 1101, at least one storage medium 1102, and at least one communications interface 1103. The controller 1101, the storage medium 1102, and the communications interface 1103 are connected and communicate with each other by using a communications bus.

The controller 1101 may be a general-purpose central processing unit (CPU), a microprocessor, an application-specific integrated circuit (application-specific integrated circuit, ASIC), or one or more integrated circuits that are configured to control program execution in the foregoing embodiments.

The communications interface 1103 is configured to communicate with another device or communications network, such as an Ethernet network, a radio access network (RAN), or a wireless local area network (Wireless Local Area Network, WLAN).

The storage medium 1102 may be a read-only memory (read-only memory, ROM) or another type of static storage device that can store static information and instructions, or a random access memory (random access memory, RAM) or another type of dynamic storage device that can store information and instructions; or may be an electrically erasable programmable read-only memory (Electrically Erasable Programmable Read-Only Memory, EEPROM), a compact disc read-only memory (Compact Disc Read-Only Memory, CD-ROM), another compact disc storage, an optical disc storage (including a compact disc, a laser disc, an optical disc, a digital versatile disc (DVD), a BLU-RAY disc, or the like), a disk storage medium, another disk storage device, or any other medium that can be configured to carry or store expected program code that has an instruction or digital structure form and that can be accessed by a computer. However, a form of the memory is not limited herein. These memories may exist independently, and are connected to the processor by using the bus. Alternatively, these memories may be integrated with the processor.

The storage medium 1102 is configured to store application program code that is used to implement the foregoing embodiments, and execution of the application program code is controlled by the controller 1101. The controller 1101 is configured to execute the application program code stored in the storage medium 1102.

The code stored by the storage medium 1002 may be used to execute the foregoing data reading method that is executed by the terminal device, for example: The controller of the memory receives the read operation request carrying the first address, where the read operation request is used to instruct the controller to perform the read operation on the first address; the controller of the memory performs the N read operations on the first address, and obtains the N pieces of data read by the N read operations; the controller of the memory determines whether the N pieces of data are consistent; and if the controller determines that the N pieces of data are consistent, the controller sends the response information used to respond to the read operation request, where the response information includes any one of the N pieces of data.

It should be noted that, to make the description brief, the foregoing method embodiments are expressed as a series of actions. However, persons skilled in the art should appreciate that the present invention is not limited to the described action sequence, because according to the present invention, some steps may be performed in other sequences or performed simultaneously. In addition, persons skilled in the art should also appreciate that all the embodiments described in the specification are optional embodiments, and the related actions and modules are not necessarily mandatory to the present invention.

In the foregoing embodiments, the description of each embodiment has respective focuses. For a part that is not described in detail in an embodiment, reference may be made to related descriptions in other embodiments.

In the several embodiments provided in this application, it should be understood that the disclosed apparatus may be implemented in other manners. For example, the described apparatus embodiment is merely an example. For example, the units described herein are divided or separated based on merely logical function, but may be divided differently in actual implementations. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, the units or function units in the embodiments of the present invention may be integrated into one processing unit, or each of the units may exist alone physically, or two or more units may be integrated into one unit. The integrated unit may be implemented in the form of hardware, or may be implemented in form of a software function unit.

When an integrated unit is implemented in the form of a software function unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a read-only memory (ROM, Read-Only Memory), a random access memory (RAM, Random Access Memory), a removable hard disk, a magnetic disk, or an optical disc.

Persons of ordinary skill in the art may understand that all or some of the steps of the methods in the embodiments may be implemented by a program instructing relevant hardware. The program may be stored in a computer readable storage medium. The storage medium may, include a flash memory, a read-only memory (ROM for short), a random access memory (RAM for short), a magnetic disk, an optical disc, or the like.

The embodiments of the present invention are described in detail above. The principle and implementation of the present invention are described herein by using specific examples. The description about the embodiments of the present invention is merely provided to help understand the method and core ideas of the present invention. In addition, persons of ordinary skill in the art can make variations and modifications to the present invention in terms of the specific implementations and application scopes according to the ideas of the present invention. Therefore, the content of specification shall not be construed as a limit to the present invention.

What is claimed is:

1. A data reading method, comprising:
    receiving, by a controller of a memory, a read operation request carrying a first address, wherein the read operation request is used to instruct the controller to perform a read operation on the first address;
    performing, by the controller of the memory, N read operations on the first address, and obtaining N pieces of data read by the N read operations;
    performing, by the controller of the memory, T random read operations between any two consecutive read operations of the N read operations performed by the controller of the memory on the first address, wherein the T random read operations are read operations respectively performed on T random addresses, and wherein quantity T and the T random addresses are generated by the controller of the memory according to a random number generated by the controller;
    determining, by the controller of the memory, whether the N pieces of data are consistent; and
    sending, by the controller of the memory, response information used to respond to the read operation request if the controller determines that the N pieces of data are consistent, wherein the response information comprises any one of the N pieces of data.

2. The method according to claim 1, wherein the read operation request is sent by a processor of a first terminal device in which the memory is located, or a second terminal device connected to the first terminal device in which the memory is located.

3. The method according to claim 1, wherein any two of the T random addresses are different.

4. The method according to claim 1, wherein the method further comprises:
    discarding, by the controller of the memory, data obtained by the T random read operations.

5. The method according to claim 1, wherein the method further comprises:

sending, by the memory, abnormal alarm information used to respond to the read operation request if the N pieces of data are inconsistent.

6. The method according to claim 1, wherein the quantity T is generated according to a first number of bits in the random number, and wherein the T random addresses are generated according to a second number of bits in the random number.

7. An apparatus, comprising:

a non-transitory storage medium that stores executable program code; and a controller coupled to the storage medium;

wherein the controller is configured to call the executable program code stored in the storage medium, and to perform the following operations:

receiving a read operation request carrying a first address, wherein the read operation request is used to instruct the controller to perform a read operation on the first address;

performing N read operations on the first address, and obtaining N pieces of data read by the N read operations;

performing T random read operations between any two consecutive read operations of the N read operations on the first address, wherein the T random read operations are read operations respectively performed on T random addresses, and wherein quantity T and the T random addresses are generated according to a random number generated by the controller;

determining whether the N pieces of data are consistent; and sending response information used to respond to the read operation request if the controller determines that the N pieces of data are consistent, wherein the response information comprises any one of the N pieces of data.

8. The apparatus according to claim 7, wherein the read operation request is sent by a processor of a first terminal device in which a memory is located, or a second terminal device connected to the first terminal device in which the memory is located.

9. The apparatus according to claim 7, wherein any two of the T random addresses are different.

10. The apparatus according to claim 7, wherein the controller is configured to discard data obtained by the T random read operations.

11. The apparatus according to claim 7, wherein the controller is configured to send abnormal alarm information used to respond to the read operation request if the controller determines that the N pieces of data are inconsistent.

12. The apparatus according to claim 7, wherein the quantity T is generated according to a first number of bits in the random number, and wherein the T random addresses are generated according to a second number of bits in the random number.

* * * * *